(«12») United States Patent
Ishihara et al.

(10) Patent No.: US 7,118,482 B2
(45) Date of Patent: Oct. 10, 2006

(54) GAME SYSTEM USING GAME CARDS AND GAME MACHINE

(75) Inventors: Tsunekazu Ishihara, Tokyo (JP); Masayoshi Tanimura, Yamanashi (JP)

(73) Assignees: Nintendo Co., Ltd., Kyoto (JP); Creatures, Inc., Tokyo (JP)

( * ) Notice: Subject to any disclaimer, the term of this patent is extended or adjusted under 35 U.S.C. 154(b) by 0 days.

(21) Appl. No.: 09/866,541

(22) Filed: May 29, 2001

(65) Prior Publication Data

US 2002/0028710 A1 Mar. 7, 2002

Related U.S. Application Data

(60) Provisional application No. 60/276,029, filed on Mar. 16, 2001.

(30) Foreign Application Priority Data

May 29, 2000 (JP) .............................. 2000-158754

(51) Int. Cl.
*A63F 9/24* (2006.01)
(52) U.S. Cl. ...................................... 463/43
(58) Field of Classification Search ................ 463/12, 463/11, 44, 43
See application file for complete search history.

(56) References Cited

U.S. PATENT DOCUMENTS

| | | | | |
|---|---|---|---|---|
| 4,386,773 A | * | 6/1983 | Bronstein | .................... 345/567 |
| 4,861,031 A | | 8/1989 | Simms | |
| 4,958,837 A | | 9/1990 | Russell | |
| 5,026,058 A | * | 6/1991 | Bromley | ......................... 463/3 |
| 5,067,079 A | | 11/1991 | Smith, III et al. | |
| 5,190,285 A | | 3/1993 | Levy et al. | |
| 5,212,368 A | * | 5/1993 | Hara | ........................... 235/375 |
| 5,331,141 A | * | 7/1994 | Kaneko | .................. 235/462.18 |
| 5,411,259 A | | 5/1995 | Pearson et al. | |
| 5,586,238 A | * | 12/1996 | Murata | ........................ 345/629 |
| 5,625,534 A | | 4/1997 | Okaya et al. | |
| 5,662,332 A | * | 9/1997 | Garfield | ...................... 273/308 |
| 5,791,988 A | * | 8/1998 | Nomi | ........................... 463/11 |

(Continued)

FOREIGN PATENT DOCUMENTS

EP 0 988 875 A2 3/2000

(Continued)

OTHER PUBLICATIONS

Punched Card History, Jones, Doug, http://www.cs.uiowa.edu/~jones/cards/history.html.*

(Continued)

*Primary Examiner*—Corbett B. Coburn
(74) *Attorney, Agent, or Firm*—Nixon & Vanderhye P.C.

(57) ABSTRACT

A game system includes a plurality of game cards, a game cartridge and a game machine. Each game card visually portrays a figure of a character, stores ability data for the character, and mechanically readably records an identification code and individuality expressing data of the character. The game information storage medium stores a game program for generating at least some of the characters of the game cards in an image display game. The game machine receives therein the game information storage medium. The game machine includes a CPU to execute a game program for an image display game. The game information storage medium is provided with a data reader to read out the identification data and individuality expressing data of the character recorded on the game card. The CPU, when supplied with the identification data and individuality expressing data from the reader, adds the individuality expressing data to the game program thereby executing a game process for the image display game.

60 Claims, 6 Drawing Sheets

U.S. PATENT DOCUMENTS

| | | | |
|---|---|---|---|
| 5,855,001 A * | 12/1998 | Doederlein et al. | 273/237 |
| 5,902,991 A | 5/1999 | Kumar | |
| 5,959,281 A * | 9/1999 | Domiteaux | 235/375 |
| 5,962,839 A * | 10/1999 | Eskildsen | 235/375 |
| 6,200,216 B1 | 3/2001 | Peppel | |
| 6,234,389 B1 | 5/2001 | Valliani et al. | |
| 6,267,678 B1 * | 7/2001 | Kubo et al. | 463/44 |
| 6,270,402 B1 * | 8/2001 | Fujioka et al. | 463/2 |
| 6,322,077 B1 * | 11/2001 | Braunlich et al. | 273/292 |
| 6,379,253 B1 * | 4/2002 | Nishioka | 463/43 |
| 6,398,651 B1 * | 6/2002 | Yamada | 463/1 |
| 6,419,584 B1 | 7/2002 | Sakamoto et al. | |
| 6,468,162 B1 | 10/2002 | Nakamura | |
| 6,484,942 B1 * | 11/2002 | Yokoyama et al. | 235/462.03 |
| 6,547,662 B1 * | 4/2003 | Yamada | 463/11 |
| 6,554,702 B1 | 4/2003 | Mahar et al. | |
| 2001/0044337 A1 | 11/2001 | Rowe et al. | |
| 2003/0022708 A1 | 1/2003 | Yano et al. | |

FOREIGN PATENT DOCUMENTS

| | | |
|---|---|---|
| EP | 0 988 875 A3 | 6/2002 |
| JP | 5-30475 | 5/1993 |
| JP | 9-062812 | 3/1997 |
| JP | 2001198602 | 6/2001 |

OTHER PUBLICATIONS

"Architecture for a Video Arcade Game Network." *IBM Technical Disclosure Bulletin*, Apr. 1991, 3 pages (pp. 138-141).
Adams, "Bar Code 1, 2-Dimensional Bar Code Page", http://www.adams1.com/pub/russadam/stack.html, 12 pages, 1995-2003.
"Games that Never Made it to America", Nintendo Power, vol. 56, pp. 60-66, Jan. 1994.
Nintendo Game Boy packaging, 1989. (2 pages).
"Barcode Battler Console Information" from www.consoledatabase.com (3 pages).
"Barcode Battler" from www.redshirt.co.uk (8 pages).
"Super Barcode Battler" from www.gamersgraveyard.com (2 pages).
"Epoch Barcode Battler" from www.heimcomputer.de (3 pages).
www.vidgame.net (1 page).
www.barcodebattler.free.fr (2 pages).
"Barcode Battler Peripherals" from www.snescentral.edgeemu.com (3 pages).
"Barcode Battler II Super Mario World" packaging (1 page).
"Conveni Wars Barcode Battler II" packaging (1 page).
"Barcode Eleven" from www.zappa.rainiac.com (1 page).
"Barcode Battler" from www.wolfgames.com (2 page).
"Super Barcode Wars Multi Scanning System" packaging (1 page).
"Bandai 1992 Gundam Super Barcode Wars Game Set" from www.esdlife.toyeast.com (4 pages).
"DBZ: Barcode Battler" from www.planetnintendo.com (3 pages).
"Mortal Combat" packaging (2 pages).
"Tiger Super Street Fighter II Barcodzz" from www.handheldmuseum.com (1 page).
"Tiger—BARCODZZ—The Adventures of Batman and Robin (163)" from www.retrotrader.com (2 pages).
www.atarihq.com (3 pages).
"Dragonball Super Barcode Wars Cards" from www.home.lgcy.com (1 page).
"PP CARDS" from www.radittzu.com (7 pages).
"Muscara.com: Dragon Ball Japanese Cards" from www.muscara.com (3 pages).
"9 Dragonball Z Character Collection 1993 Card" from www.ebay.com.sg (2 pages).
"Dragon Ball Super Barcode Wars Part 2 Full Set (42pcs)" from www.hk.fl.page.auctions.yahoo.com (4 pages).
Namcot Barcode Boy Set documents, 1992, Namco and Sofel, 6 pages of packaging, and Battle Space instructions booklet, 15 pages.
Nintendo Game Boy packaging, 1989.
Conveni Wars Barcode Battler II, 1993, packaging and instructions, 15 pages.
Conveni Wars Barcode Battler II, 1993, instruction booklet, 14 pages and Super Mario World for Conveni Wars Barcode Battler II instruction booklet, 4 pages.
Namcot Barcode Boy instructions, 1992, 6 pages.

* cited by examiner

GAME SYSTEM USING GAME CARDS AND GAME MACHINE

This application claims the benefit of U.S. Provisional Application No. 60/276,029, filed Mar. 16, 2001, the entire content of which is hereby incorporated by reference in this application.

FIELD OF THE INVENTION

This invention relates to a game system, and game cards and a game information storage medium to be used in the game system. More particularly, the invention relates to a game system including an electronic video game device and a game information storage medium storing a game program related to the characters recorded on the game cards, and to game cards or collection cards to be used in such game system and a game information storage medium.

BACKGROUND AND SUMMARY OF THE INVENTION

A Japanese Patent Publication No. 30475/1993 (issued on May 10, 1993) describes a card-game toy using a combination of an electronic game machine and barcode-recorded cards. This card-game toy resulted in a product called BARCODE BATTLER. This game utilizes the numeric data recorded as barcodes on the cards so that the card used by the offensive player is allowed to battle against the card used by the defensive player, thereby enabling competition for superiority or inferiority in barcode-recorded numeric data. The card used in the card game toy has barcode (so-called one-dimensional barcode) data configured by a combination of two kinds of bars differing in thickness arranged in a predetermined number in a reading direction (horizontal direction). The barcodes are optically read and used for the electronic game.

The conventional card-game toy, despite having the figures of characters etc. on the cards, is less related with respect to the electronic or video game content to the cards. Because of the insufficient amount of data recorded using the barcodes, the electronic game using the barcode data is liable to be monotonous resulting in the loss of player interest, thereby making it difficult to realize an interesting game.

The exemplary embodiments of the present invention provide a game system using game cards which are playable for card games, an electronic game device associated with such game cards (for an interactive game) and a game information storage medium to be used for same. The game cards and the electronic apparatus may be used independently. The disclosed combination results in a game system which is designed to hold players' interest over a long term.

The exemplary embodiments provide game cards which record or store a large amount of data for representing the individual features of characters (e.g. sound data, dot data (graphic data) or text data explaining the features of the characters, etc.). The data may be recorded on the cards, for example, by printing or other methods.

The exemplary embodiments provide a game system using game cards such that a particular character not included in the characters appearing in an electronic game can be stored in a collection card or game card so that the particular character input from the collection card can be used in game play. In accordance with an exemplary embodiment, the game system may use game cards where data, such as character identification codes, individuality expressing data (ability data, sound data, text data for explaining features or text translation data thereof), additional data and control data, may be optically, readably recorded by a two-dimensional barcode arrangement, to thereby inexpensively combine an electronic game with game cards recording a great deal of data.

In accordance with one exemplary embodiment, a game system uses game cards each visually recognizably printed with a character figure and ability data and to be used for a card game. The game system also uses a game information storage medium storing a game program to appear at least part of the characters in the game cards, and a game machine including a processor system for receiving therein the game information storage medium to execute an image display game program. The plurality of game cards mechanically readably records or stores (hereinafter, these terms may be used separately where the exact meaning depends on the kind of medium used for recording or storing data) data for each of the characters depicted with figures, or identification codes of the characters and individuality expressing data for expressing the individuality of the character. External information reading circuitry is provided in any one of the game information storage medium and the game machine, for example, to optically, electrically or magnetically read data in accordance with a mechanically readable storage form recorded or stored in the game card. A game information storage medium is preferably a fixed memory or non-volatile memory for storing the game program in a fixed or non-volatile fashion.

Due to such external information reading circuitry, when the game card record or storage data is placed in a readable state, the character individuality expressing data recorded or stored in the game card is read out. The processor system, when supplied with the identification code and individuality expressing data read out of the external information reading circuitry, uses the individuality expressing data in conjunction with the game program stored in the game information storage medium thereby executing a game process.

In accordance with further exemplary embodiments, game cards to be used in a game system having a game information storage medium storing a game program to display the characters depicted in part of a plurality of game cards in an image display game, a game machine including a processor system for receiving therein the game information storage medium to execute an image display game program, and external information reading circuitry provided in any of the game information storage medium and the game machine to read out the data recorded or stored in the game card.

These game cards are also designed for playing a card game using the cards. A character figure and ability data is printed on one surface. At least an identification code of the character and the individuality expressing data for expressing individual characteristics of the character are mechanically readably recorded in each card depicted with a different character figure. The individuality expressing data is read out by the external information reading circuitry and used in a game on the game machine.

The game information storage medium of the exemplary embodiments is a game information storage medium to be used in a game system having a plurality of game cards each visually recognizably printed with a character figure and ability data (or attribute data) and to be used for a card game, a game machine including a processing system for receiving therein a game information storage medium to execute an image display game program, and external information reading circuitry provided in any of the game information storage medium and the game machine to read out the data recorded in the game card. The game cards mechanically readably record or store, for each figure-depicted character, at least an information code of the character and the individuality expressing data for expressing character individuality.

The game information storage medium stores a first game program for executing a game to display characters depicted in at least part of the game cards to enable an image display game separately from a game by the game cards, and a second program for executing a game added with the individuality expressing data to the first game program when supplied with the identification code and individuality expressing data read out of the external information reading circuitry.

The processing system executes the first game program when the external information reading circuitry has not read the recorded or stored data in the game card, and second game program when the recorded data in the game card is read out and input.

According to an exemplary embodiment, an associated game of an electronic game with the game cards (or interactive game) can be independently played as a card game using the game cards. Thus, it is possible to enjoy a single game with only the game cards or only the electronic game or a combined game using the game cards and the electronic game.

According to an exemplary embodiment, game cards are acquired having a large amount of information recorded or stored thereon including data for representing individual characteristics of the characters recorded in the cards by printing or other methodology (e.g. sound data, dot data (image data) or text data explaining the features of the characters, etc.).

According to an exemplary embodiment, a game information storage medium is used that is s combined game which may be used not only by an electronic game or video game but can also be enjoyed using the game cards having a great information amount of data recorded or stored thereon representing the individual characteristics of the characters recorded in the cards by printing or so (e.g. sound data, dot data (image data) or text data explaining the features of the characters, etc.).

According these embodiments, various games are feasible by the use of the game cards having a large amount of information recorded or stored thereon, e.g., sound data of characters on the cards by printing or other methodology, dot data (image data) and/or data for representing the individualities of the characters, text data or the like explaining the features of the characters. Also, a particular character not existing as one of the characters appearing in the electronic game can be recorded in a collection card or game card so that a game can be played using the particular character input from the collection card. It is possible to obtain a game system using the game cards using a character unique to the player differently from the inherent electronic game or video game.

Furthermore, according to exemplary embodiments, it is possible to obtain a game system using game cards combined with an electronic game through the use of inexpensive game cards optically readably recording various data such as character identification codes, individuality expressing data (ability data, sound data, text data of texts explaining the features or translation data of the texts), additional data and control data by a two-dimensional barcode scheme to have a great deal of data recorded thereon.

The above described features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
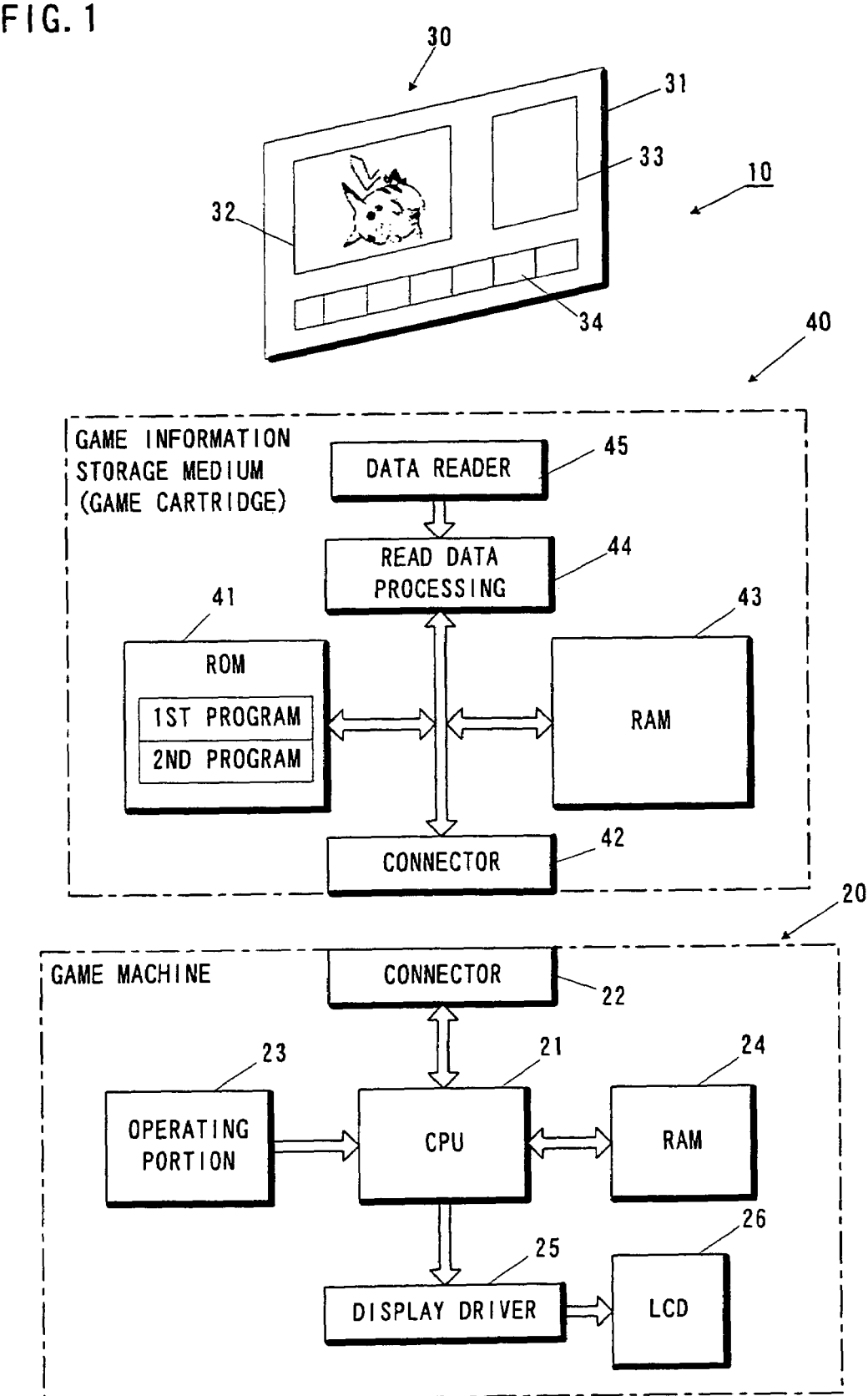
FIG. 1 is a block diagram for explaining the an exemplary embodiment of the present invention.

FIG. 1 is a block diagram for explaining an exemplary embodiment of the present invention. In FIG. 1, a game system 10 using game cards of the invention includes an electronic game machine such as a portable game machine or video game machine (hereinafter, collectively referred to as "game machine") 20, game cards 30, and a game cartridge as an example of a game information storage medium (hereinafter, briefly referred to as "cartridge") 40. The game machine 20 includes a CPU 21 as an example of a processing system. The CPU 21 is connected via a connector 22 for removably receiving the game cartridge 40. CPU 21 is also connected to an operating section 23, a RAM 24 for temporarily, writably/readably storing data and a display drive circuit 25. The display drive circuit 25 is connected to a liquid crystal display (LCD) 26. For implementations, where the game machine 20 is a home video game machine, a TV monitor (not shown) is connected in place of the LCD 26 and a video signal generating circuit (not shown) is provided in place of the display drive circuit 25 to thereby convert image display data into video signals (video signals or RGB signals).

The game card 30 is preferably formed, on one main surface 31 of the card, with an illustration display area 32, an ability data recording area 33, and an information recording area 34 for recording individuality expressing data. The card 30 may be in any of a wide variety of physical forms. Where the game card 30 is in a vertically-long rectangular form, for example, the illustration display area 32 is formed in a most conspicuous upper region (upper half) or in a region somewhat broader than the upper half, to depict therein various characters such as animals, humans or imaginary monsters by printing. The character depicted in the illustration display area 31 is a character which differs in kind, design or figure on a card-by-card basis and may include a feature of the card, including a character that will appear on a game screen upon executing the game program (such as a hero character, ally or enemy characters or to-be-collected characters). It is preferred to distribute a combination of a multiplicity of cards (e.g. 30 to 40 cards) (called "Starter Kit") or packaged with the game cartridge 40 so that such novel or desired characters to be collected by a collector can be included at a certain probability. Separately from such a set distribution on a many-card basis, there would be cases of set distribution on a reduced-number-of-cards basis (called "extension pack").

The ability data recording area 33 is an area for displaying in letters, symbols, numerals or a combination thereof ability data (may be referred to as attribute data) of a character being depicted in the illustration display area 32. For example, visually (visually recognizably) printed with data including a character name, a character No., letters or symbols representing weapons or magic to be used by the character, physical strength, power, hit point, offensive power, defensive power, etc. together with the numerals representative of the amount, and other kinds of data. The ability data recording area 33 is printed with a symbol representative of a degree of rarity value of a game card 20 depicting the character (rareness mark).

The information recording area 34 is preferably formed along at least one side of the game card 30. The information recording area 34 may be formed along the opposite two sides in a region except for the illustration display area 32 and ability data recording area 33 of the game card 30 as required, or along three or four sides surrounding the illustration display area 32 and ability data recording area 33. The individuality expressing data to be recorded or stored is, for example, the discrimination codes of the characters recorded in the ability data recording area 33, or the ability data such as letter (or text) data of words or texts explaining the tricks, weapons or features to be used in the game, or additional data (e.g. sound data, dot data representing character figures or graphic data). The ability data and additional data are the data to be properly selected depending upon game content. The additional data includes voices for the character as a human, sound data such as cries for animals or imaginary monsters, and additional ability data other than the ability data recorded in a visualizing form (concealed ability data concerning the items capable of using magic or turning into an unrivaled state in a certain time).

For example, where the game is concerned in content with an imaginary monster capturing or raising game, the character to be depicted in the illustration display area 32 may be a monster, wherein the individuality expressing data to be recorded or stored in the information recording area 34 (ability data and/or additional data) may be trick data on a monster-by-monster basis, sound data of cries, evolution-related data, explanatory texts of words or texts to explain the feature of a monster (letter of text data), translation data of such explanatory texts and so on. Meanwhile where the game content is a sports game such as baseball or soccer, the character may be an athlete's picture (baseball or soccer) and the individuality expressing data be pictured-athlete's team name player's number, age and score data (in baseball, for a batter a batting average, home-run count, r.b.i, stolen bases, running power, etc. and for a pitcher an earned run average, strike-outs, etc. and for soccer, physical ability, points scored, assist count, etc.). Where the game content concerns a role-playing game or action game, the character may be a game-appearing person, animal or imaginary animal or plant while the individuality expressing data may be the appearing-person's life, power, ability, available items (weapons, guards, magic) and so on.

Where a plurality of game cards 30 are combined to enable playing one mini-game, the program for the mini-game is divided into a plurality. The divisional parts of the mini-game program and order data are recorded separately in the information recording areas 34 of the game cards 30. In this case, a plurality of mini-game programs may be previously prepared to provide different kinds of mini-games in accordance with the card kinds (the kind of monster based on water, fire, grass or the like of the card).

The recording on the information recording area 34 may be accomplished by properly combining a plurality of kinds of data. The data for determining a data amount (bytes) on each kind may be previously recorded in a header section to determine a data amount for each kind of the recorded data thereby reflecting upon an electronic game.

The game cards 30 are to be collected as collection cards (trading cards) owing to the allure of the figure printed on the illustration display area 32, and used independently as a card game by use of the information recorded within the ability data recording area 43.

The explanations below are be by way of example of the electronic game content is an imaginary monster capturing or raising game wherein the figures on the game cards 30 are monsters to appear in the electronic game.

The method for recording the individuality expressing data is to be considered, for example, by an optically readable recording scheme, an electrically readable storing scheme, a magnetically readable recording scheme or other methodology. The optical recording method uses, for example, printing with two-dimensional "barcodes" formed, not with bars, but with dot arrays. The two-dimensional "barcodes" has a recording area formed by gathering together, in a scanning direction, unit blocks or lattices each having a predetermined area (e.g. 3×3 square mm), thereby distributing dots vertically and horizontally in each block. Furthermore, printing is made such that the dot distribution is varied in each column (or line) as divided at a constant interval in any of the vertical and horizontal directions. This makes it possible to record a great deal of data (e.g. approx. 100 bytes of data per one block). In the two-dimensional barcode recording scheme, in addition to the character identification codes and individuality expressing data to be inherently recorded, block Nos. are recorded as the data not to be used in game processing but to distinguish the data arrangement order in each block. This makes it possible to read the order of reading even in an arbitrary case where the information recording area 34 is formed in a reading (moving) direction of the game card 30 and/or in a plurality of locations in one card. By changing the arrangement of the data having been read out, the reading data is easy for use in an electronic game.

In an electrically storing method, the game card 30 is configured, for example, as an IC card. An data input/output terminal is formed in the vicinity of the IC formation, and individuality expressing data is previously written or stored on the non-volatile memory (ROM) within the IC. In this case, the ROM capacity within the IC is different depending upon the integration degree of the IC chip. When the capacity is insufficient only with the ROM, it is possible to use a writable/readable memory (RAM) within the IC chip. Also, in the magnetic recording method, magnetic stripes are formed in the information recording area 34 in order for magnetic recording onto the magnetic stripes by use of a magnetic head.

These recording methods, each have associated advantages and disadvantages, and may be properly selected taking into consideration the use, purpose and convenience. For example, the two-dimensional barcode is great in capacity and hence inexpensive but it is lower in reading accuracy upon deposit with dust or scribbling. The IC card is high in storage capacity, high in reading accuracy, readable at high speed and is also writable. The data reader/writer will be available at low cost. If there is a defect, the cost of the IC card is expensive. With the magnetic stripe, writing and reading is possible with an inexpensive structure but there is a disadvantage that the amount of information to be recorded is less and the data is readily compromised by a nearby magnet. Accordingly, a proper recording form may be selected taken into consideration the proposed use purpose, user age, purchase price of the game cartridge 30, etc.

The game information storage medium 40 is a game cartridge (hereinafter "cartridge") configured by incorporating within a case (not shown) a non-volatile memory or fixed storage memory (e.g. ROM) 41, a connector 42, a writable and readable memory (RAM) 43, a read-data processing circuit 44 and a data reader 45. The connector 42 is to electrically connect the connector 22 of a game machine 20 and the cartridge 40, and uses an edge connector or the like forming a plurality of contacts in an end of a board. To the connector 42 are connected the ROM 41, the RAM 43 and the read-data processing circuit 44 through a bus. The read-data processing circuit 44 is connected with the data reader 45.

The ROM 41 includes in accordance with an exemplary embodiment, at least, a storage area storing a first program and a storage area storing a second program. The first program is an inherent game program for play independently on an electronic game, and will be different depending upon the content of a game. The second program is a program for providing a variation in the content of an electronic game by use of the individuality expressing data read out of the information recording area 34 of the game card 30. For example, the second program, if the individuality expressing data is text data explaining the feature of a character, includes a program to display the letter data on a game screen. The second program, where the individuality expressing data is an item (weapon, magic or the like) for enhancing the ability of a character, includes a program to use that item in the inherent game. The second program, where the individuality expressing data recorded on the game card 30 is dot (or graphic or image) data of a character not included in the factors appearing in game software, includes as another example a program to represent dot (graphic) data of a character read out of the game card 40. The second program, where the individuality expressing data recorded on the game card 30 is the division of a mini-game program on part-data-unit basis, includes as another example a program that part of a program is arranged in a predetermined order to constitute mini-game program to control the execution of a mini-game.

The RAM 43 is a memory for temporarily storing backup data changing with the progress of a game. This is backed up with a battery or the like (not shown) in order to prevent the data from being lost even upon removal from the game machine 20. In addition to or in place of the RAM 43, a flash memory (flash ROM) may be provided that does not require backup by a battery. The RAM 43 includes an area or table to store a plurality of kinds of ability data of a character correspondingly to the identification code of a captured (or collected) character. Also, the RAM 43 includes various storage areas such as an area to store the dot data of characters in a predetermined number, an area to store the text data of a predetermined number of characters and an area to store a program for a mini-game.

The data reader 45 reads the individuality expressing data recorded in the information recording area 34 of the game card 30. In the exemplary embodiment, the reader 45 uses an optical reader where the individuality expressing data is recorded with the two-dimensional barcode. Where stored in an IC card, an IC-card reader is used. Where recorded on a magnetic stripe, a magnetic reader is used. The read-data processing circuit 44 is a circuit for processing the data read out by the data reader 45. This makes a proper processing depending upon the recording scheme thereby performs conversion into data form to be processed by the CPU 21.

For example, where the individuality expressing data is recorded by a two-dimensional barcode, the data reader 45 includes a CCD (image) sensor and the cartridge 40 has a groove or guide part (461 in FIG. 2) formed in a part of the case to restrict the movement of the game card 30. When the game card 30 is moved parallel, the CCD sensor transforms the dot data of the two-dimensional barcode into a column unit and converts it into bit column data. This is repeated in order in the movement direction, thereby converting the two-dimensional (planar) data into one-dimensional (bit column) data. The read one-dimensional data is converted into 1-byte-unit-based data by the read-data processing circuit 44 such that it can be read to the RAM 43. This is further rearranged in the order of the block No. of the two-dimensional barcode and written to the RAM 43.

Turning first to one mode of operation the FIG. 1 embodiment, if cards 30 are not being used, the cartridge 40 is received in the game machine 20 (connection is made between the connector 22 and the connector 42). When the power switch (not shown) is turned on, the CPU executes the game process on the basis of a first program stored in the ROM 41 thereby generating the display image data for displaying game images. At this time, if the player manipulates an operation section 23 and instructs a moving direction and/or action of a hero character to appear in the game, on the basis of which the CPU 21 changes the moving direction and/or action of the hero character according to the game program. On the LCD 26 is displayed game images according to a result of processing by the CPU 21 as indicated above.

When an electronic game or video game is played using the game cards 30, the read-data processing circuit 44 and the data reader 45 are activated prior to play. When the player inputs an operation required for reading the data recorded in the information recording area 34 (e.g. by parallel-moving the game card 30 in a proximate state to the data reader 45, for two-dimensional barcode recording), the data reader 45 reads out the data and supplies, in order, the read data to the read-data processing circuit 44. The read-data processing circuit 44 converts the format of the read data into a data format to be processed by the CPU 21 and supplies it to the CPU 21. The CPU 21 writes it to the RAM 43. The CPU 21 executes the inherent game program on the basis of the first program and executes the second program, thereby executing a process to provide variation in the inherent game program by using the individuality expressing data or read data stored in the RAM 43.

For example, where the individuality expressing data is data for improving the ability of a character, a process for enhancing the ability of the character is executed rather than the game processing based only on the first game program. If the individuality expressing data is the explanatory text (text) data for explaining the feature of a character, the explanatory text thereof is displayed in association with the character. Thus, the player will know of information for advantageously using the characters in the course of the game (conquest way, hint, etc.). Where using a game card 30 recording the individuality expressing data of a special character not previously stored in the ROM 41, the individuality expressing data is read and temporarily stored in the RAM 43. The CPU 21 uses the individuality expressing data of the special character to display the dot data of the same character on the LCD 26, thereby executing a process of a game the same character appears (game varied by the inherent game).

Furthermore, where the individuality expressing data includes mini-game program data not included in the first program, data reading is performed for a plurality of game cards 40. The read data is temporarily stored in the RAM 43 with a result that stored in the RAM 43 a series of programs for the mini-game recorded divisionally in the plurality of game cards 40. While executing the game process on the basis of the first program (or a combination of the first and second programs), the CPU 21 when a scene a mini-game is playable comes suspends the process based on the first program and executes the mini-game program stored in the RAM 43 to display the images of the mini-game on the LCD 26.

Next, a detailed embodiment is explained for a case where the game machine is a portable game machine 20 and the recording scheme to the information recording area 34 of the game card 30 is by optical recording with a two-dimensional barcode. The same or corresponding parts to those of the FIG. 1 embodiment are denoted by the same reference numerals wherein the parts especially distinguished are shown by appending an alphanumeric character to the end of the same reference numeral.

Figure 2:
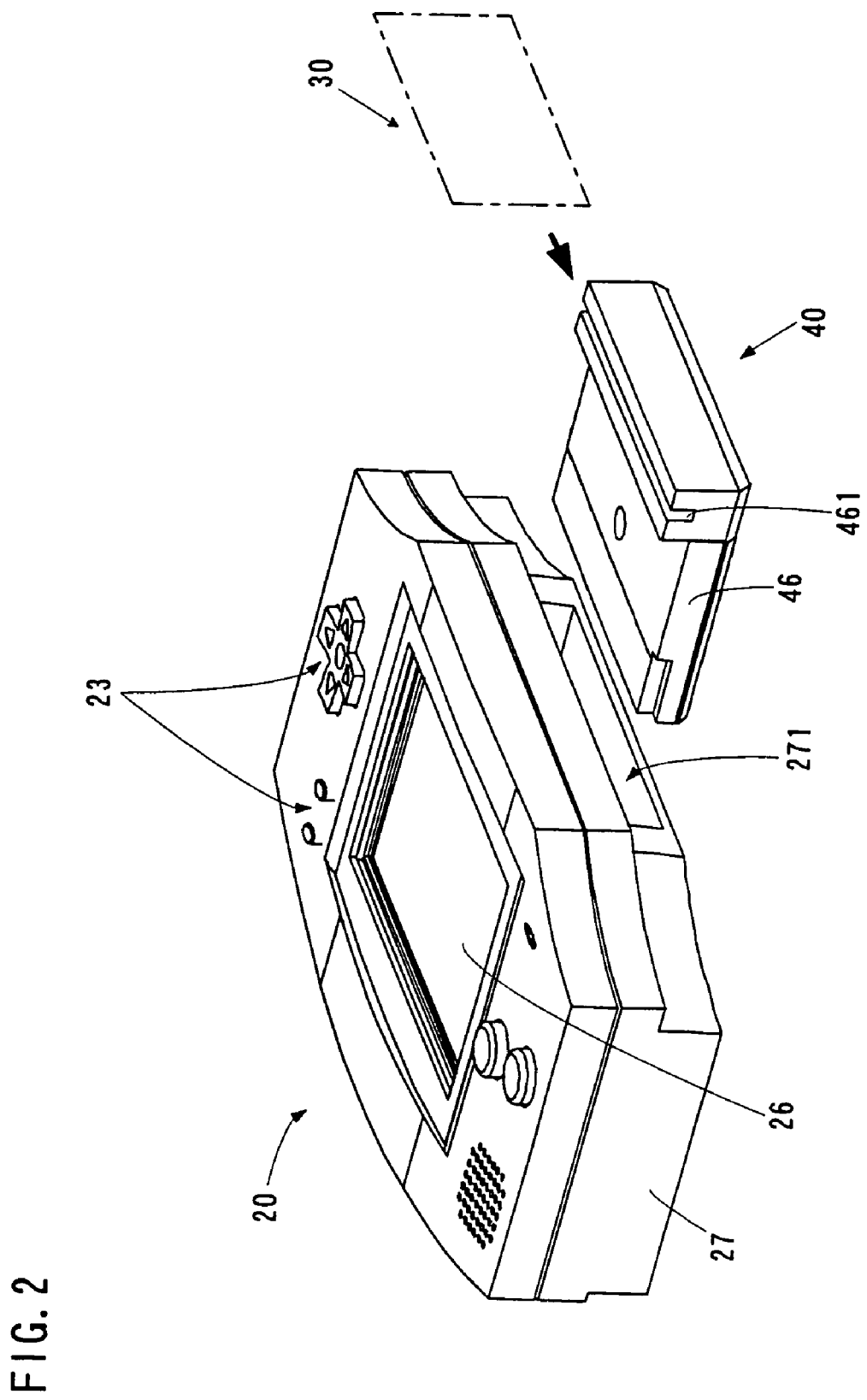
FIG. 2 is an external view of an embodiment of the invention.

FIG. 2 is an external view of an embodiment of the invention. In FIG. 2, the portable game machine 20 has an operation part 23 and LCD 26 arranged on one main surface (surface in the Figure) of a flat-formed housing 27. The housing 27 has an insertion hole 271 formed in a back-surface upper portion thereof to receive therein a cartridge 40. On the other hand, the cartridge 40 includes housing 46 having an outer shape for insertion in the insertion hole 271. The housing 46 has a guide 461 exposed from above as it is received in the portable game machine 20. The guide 461 has a groove for guiding the game card 30 in movement, and incorporates therein a data reader 45 including, for example, a CCD sensor (or charge coupled device) in order to read the data recorded in the information recording area 34.

Figure 3:
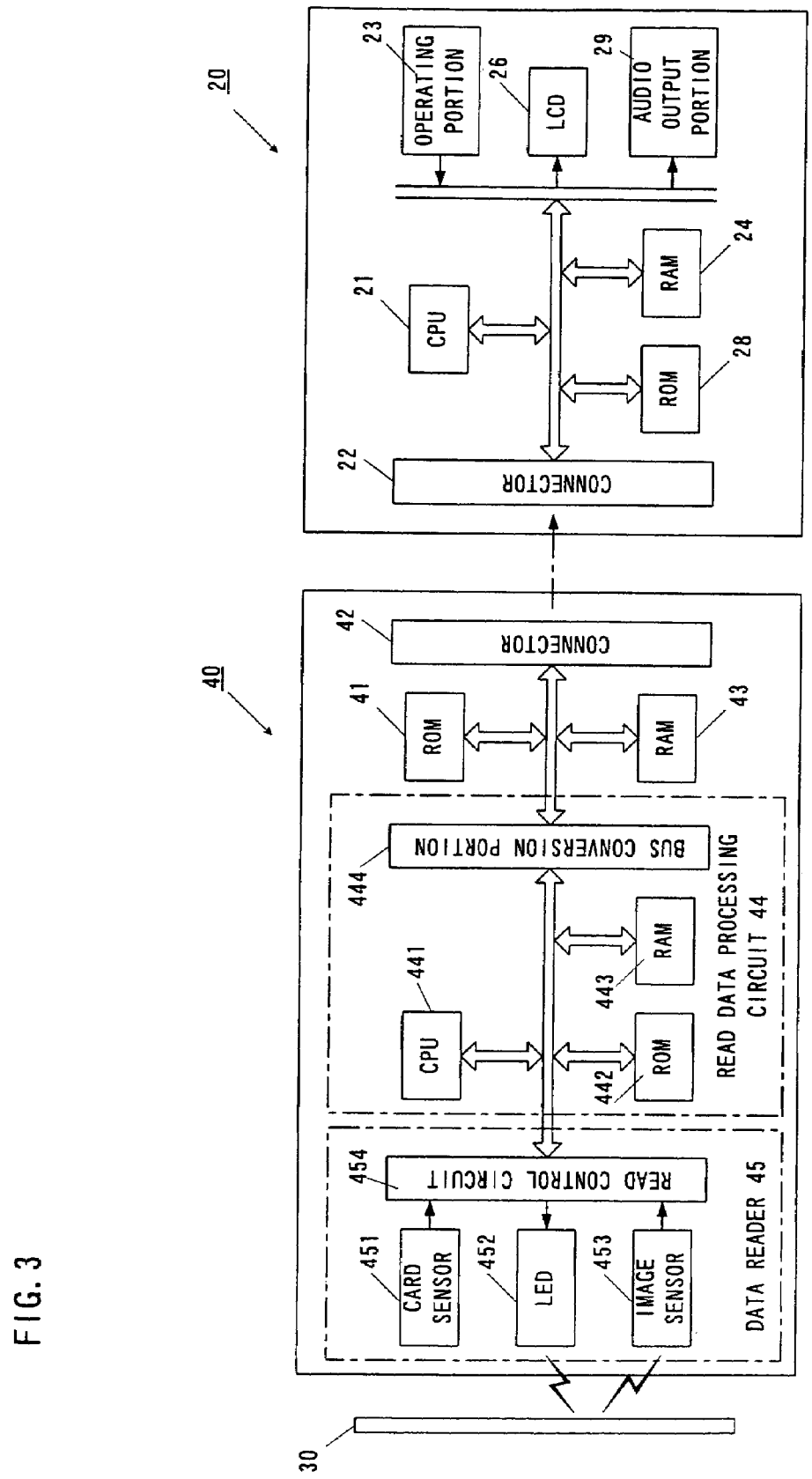
FIG. 3 is a block diagram of an embodiment of the invention.

FIG. 3 is a block diagram of an embodiment of the invention. In FIG. 3, a portable game machine 20 includes a built-in ROM 28 and a sound output section 29, in addition to the circuit shown in FIG. 1. The ROM 28 stores a program for processing at a start-up of the CPU and realizing, in a software fashion, the function of display drive circuit 25. The sound output section 29, when the CPU 21 supplies as digital data the sound effect or sound for a game stored in the ROM 41, converts the sound data into an analog sound signal to be outputted through a speaker (not shown). For further details of an exemplary portable game machine 20 reference may be made to copending application Ser. No. 09/722,410, filed on Nov. 28, 2000 and entitled "Portable Video Game System, which application is hereby incorporated herein by reference.

The data reader 45 included in the cartridge 40 includes a card sensor 451, a light-emitting diode 452 or CCD sensor (or called also an image sensor) 453 and a read control circuit 454. The card sensor 451 detects a game period of between an insertion of the game card 30 at the tip in the guide 461 and an outing thereof at the rear end from the guide 261. In this duration, a pulse is generated so that the light-emitting diode 452, the CCD sensor 453 and the read control circuit 454 are activated by the same pulse. The light-emitting diode 453 makes light-emission display during the period of the pulse input from the card sensor 451, thereby illuminating the information recording area 34 of the game card 30. The CCD sensor 453 receives the reflected light of the light-emitting diode 452 and optically read the individuality expressing data recorded in the information recording area 34. This temporarily stores the dot pattern on a block unit of the two-dimensional barcode, and converts it into dot data of one line in the moving direction of the game card (or one line in a column direction orthogonal to the moving direction), and then converting it into bit series data and supplies same to the read control circuit 454. The read control circuit 454 converts the read data into data format suited for temporary storage within RAM 443, and supplies it to the read-data processing circuit 44.

The read-data processing circuit 44 includes a CPU 441, a ROM 442, a RAM 443 and a bus converting section 444. The ROM 442 fixedly stores a program for conversion of the read data into a predetermined format, a program for controlling the writing to the RAM 443 and a program for controlling the transfer to the CPU 21 through the bus converting section 444. The CPU 441 writes the read data to the RAM 443 on a byte-unit basis and temporarily stores it on the basis of a program stored in the ROM 442. The data is read out in order, and the bus converting section 444 is caused to convert it into a data form in a predetermined format to be transferred to the portable game machine 20.

Figure 4:
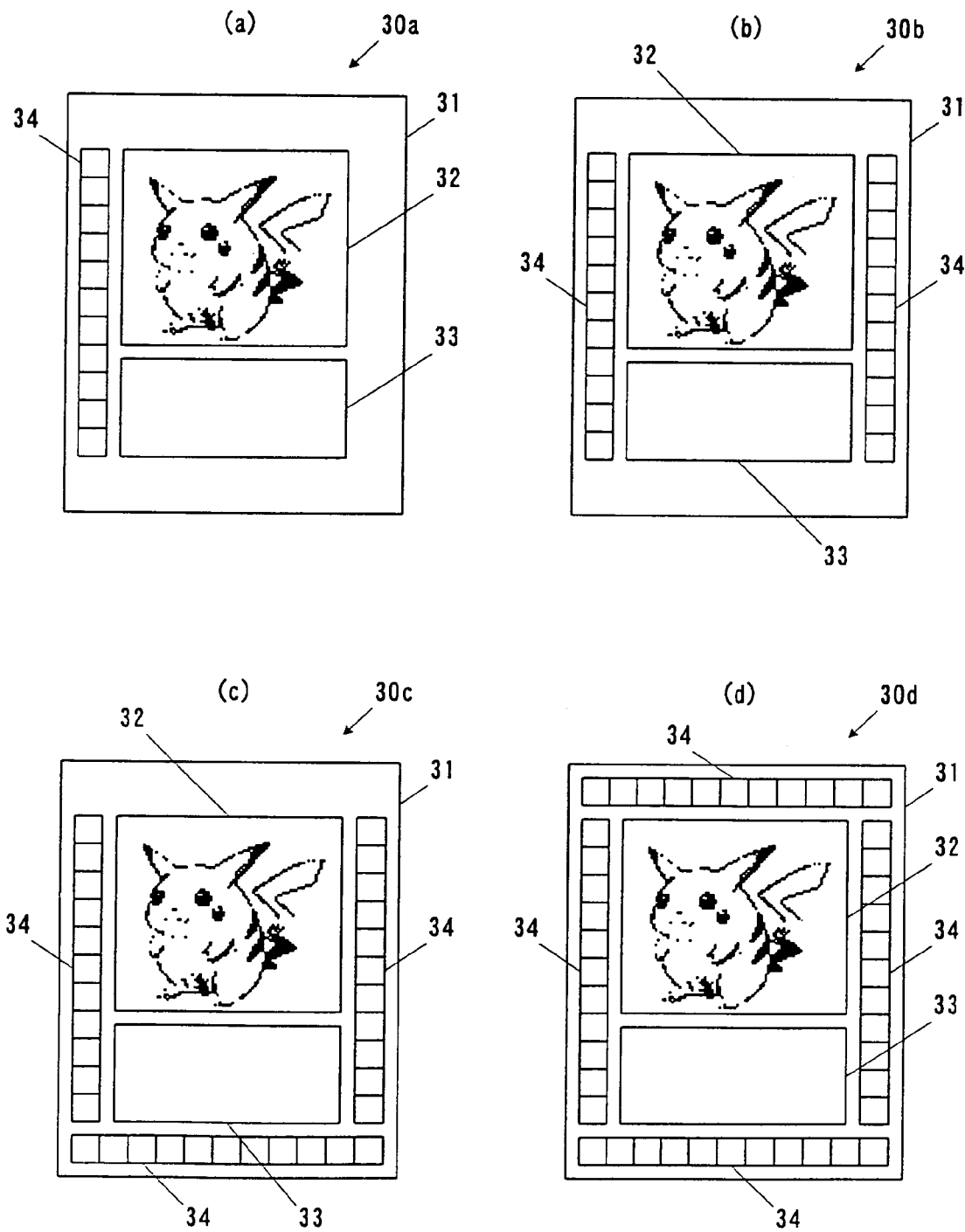
FIG. 4 is a detailed plan view of an example of a game card, showing an example of optically readably recording individuality expressing data.

FIG. 4 is a detailed plan view of an example of the game card, showing examples of where the individuality expressing data is optically readably recorded. Particularly, a game card 30a shown in FIG. 4(a) shows that one information recording area 34 is formed along one side. A game card 30b of FIG. 4(b) shows that the information recording area 34 is divisionally formed along the opposite two sides (in two locations). A game card 30c of FIG. 4(c) shows that the information recording area 34 is formed along the three sides of the card (in three locations). A game card 30d of FIG. 4(d) shows that the information recording area 34 is formed along the four sides (in four locations). Each of the game cards 30a–30d formed with one or a plurality of information recording areas 34 is recorded with a block No. in each block included in the information recording area 34 so that, even if there is a difference in reading direction and/or order, the read data out of each block can be rearranged according to the block No. order after reading out of all the blocks and used for game processing.

In this manner, the amount of information recorded can be increased by increasing the number of sides or locations forming the information recording area 34. As a result, there is an advantage that the content of an electronic game can be diversified the game cards 30.

Figure 5:
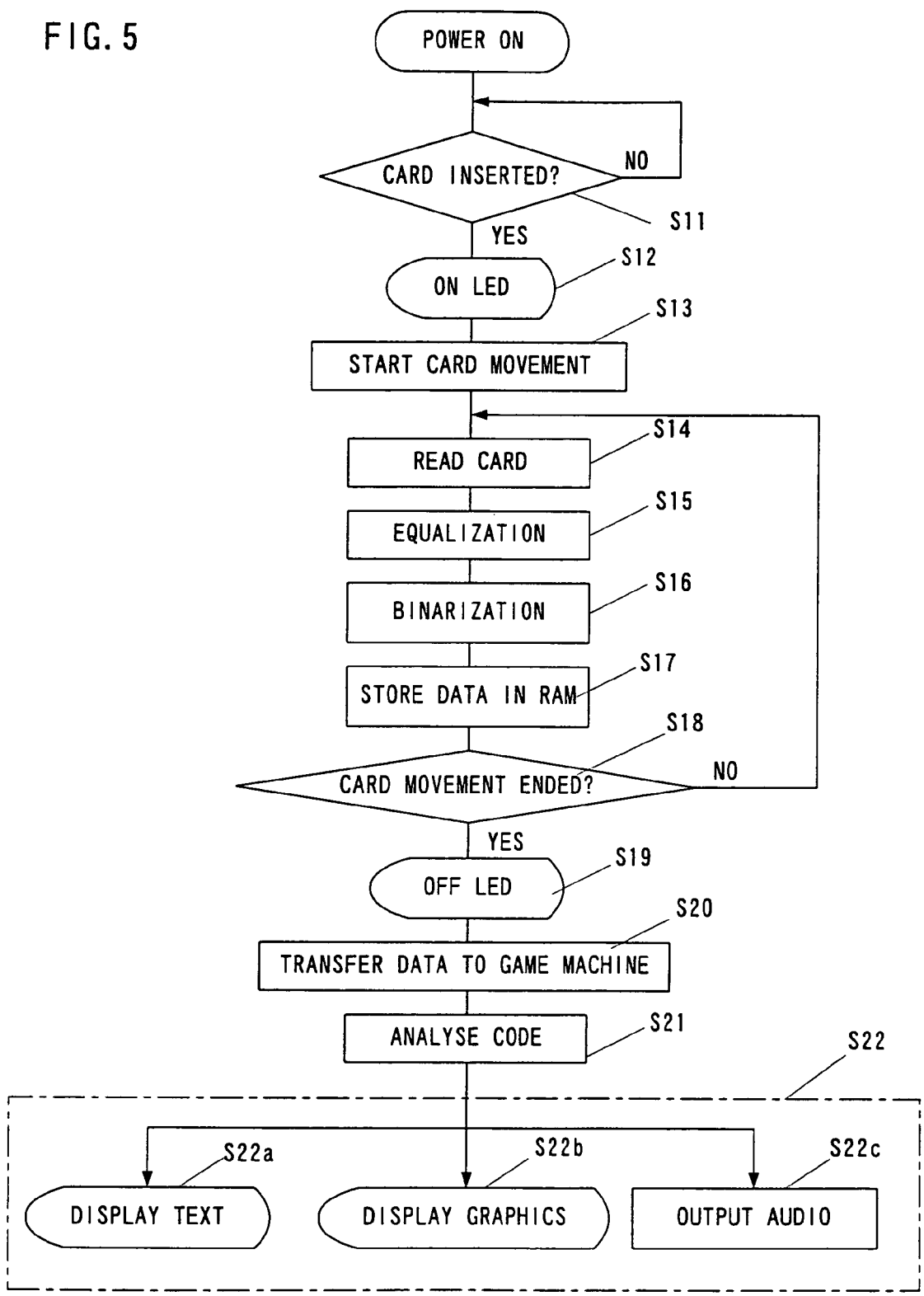
FIG. 5 is a flowchart for explaining an example of the operation of a card reader 45 and read-data processing circuit 44.

FIG. 5 is a flowchart for explaining the operation of the card reader 45 and read-data processing circuit 44 (or the process by the CPU 441). When the power switch (not shown) to the portable game machine 20 is turned on, the CPU 441 starts the operation of FIG. 5 on the basis of a program of the ROM 442. In step (shown with the symbol "S" in the Figure) 11, it is determined on the basis of an output of the card sensor 451 whether there is an insertion detection of a game card 30 or not. If there is no insertion detection, game card detection is waited for by the card sensor 451. When a game card 30 is inserted in the guide 461, the card sensor 451 detects the game card 30. In response, the light-emitting diode (LCD) 452 in step 12 is driven for lighting. In step 13, the player starts to move the game card 30 along the guide 461 in a manner of moving it along a side forming the information recording area 44. In the following step 14, the CCD sensor 453 optically reads the data recorded in the information recording area 34 by the two-dimensional barcode scheme. The data read by the CCD sensor 453 in step 15 is equivalence-processed by the read control circuit 454. This data, in step 16, is converted into binary data of "1" or "0" on a dot-unit basis. In step 17, the CPU 441 converts the binary data on a column-unit basis into a predetermined format having one block of data column, and writes and stores it in the RAM 443. In step 18, it is determined whether the movement of the game card 30 has been completed or not. If the card sensor 451 is in a period for detecting the game card 30, the process returns to the step 14 to repeat the operation of the steps 14–18 until the game card 30 has not been detected. The operation of the steps 14–18 is repeated until all the block data recorded in the information recording area 34 has been read out.

If a completion of card movement is detected in the step S18, the process proceeds to step 19 to go off the light-emitting diode 451. The record data in the information recording area 34 of one game card 30 thus read out is temporarily stored in the RAM 443. In the following step 20, the record data of the one game card 30 stored in the RAM 443 is sequentially read out by the CPU 441 and transferred to the portable game machine through the bus conversion circuit 444 and connectors 42 and 22. At this time, the CPU 21 temporarily stores the read data transferred from the cartridge 40 into the RAM 24. In step 21, the CPU 441 analyzes the read data stored in the RAM 24.

Where the information recording area 34 is formed along the opposite two sides (into locations) of the game card 30 as in FIG. 4(b), or where formed along the three sides (in three locations) of the game card 30 as in FIG. 4(c), or where formed along the four sides (in four locations) of the game card 30 as in FIG. 4(d), the process of the steps 11–21 is carried out according to such number. Also, even if the direction and/or order of reading the game card 30a–30d is different, because block Nos. are recorded in the blocks included in the information recording area 34, the read data out of the blocks can be rearranged in the order of the block No. after reading the blocks and temporarily stored to the RAM 443.

Thereafter, the CPU in step 22 carries out a process having a change, the process based on the inherent game process according to the analyzed read data, on the basis of the analyzed read data temporarily stored in the RAM 24 and the program stored in the ROM 41. The change-added process, if the data recorded in the information recording area 34 is for example text data, is a process for displaying read-out letters or text on the LCD 26 (step 22a). Also, where the data recorded in the information recording area 34 is graphic (or dot) data for displaying a character, the graphic data is displayed on the LCD 26 (step 22b). Furthermore, where the data recorded in the information recording area 34 is sound data such as cry of a monster, sound data is digital-analog (DA) converted and outputted as sound from the sound output section 29 (step 22c). Besides, various processes or operations are possible depending upon the kind of read data. The process or operation is determined depending on the record data in the information decoding area 34 and program in the ROM 41.

Although various games are to be thought of as an electronic game using the data read out of the information recording area 34 of the game card 30 (or 30a–30d) or a combined game of game cards and an electronic game, an example of which is explained in detail below.

Figure 6:
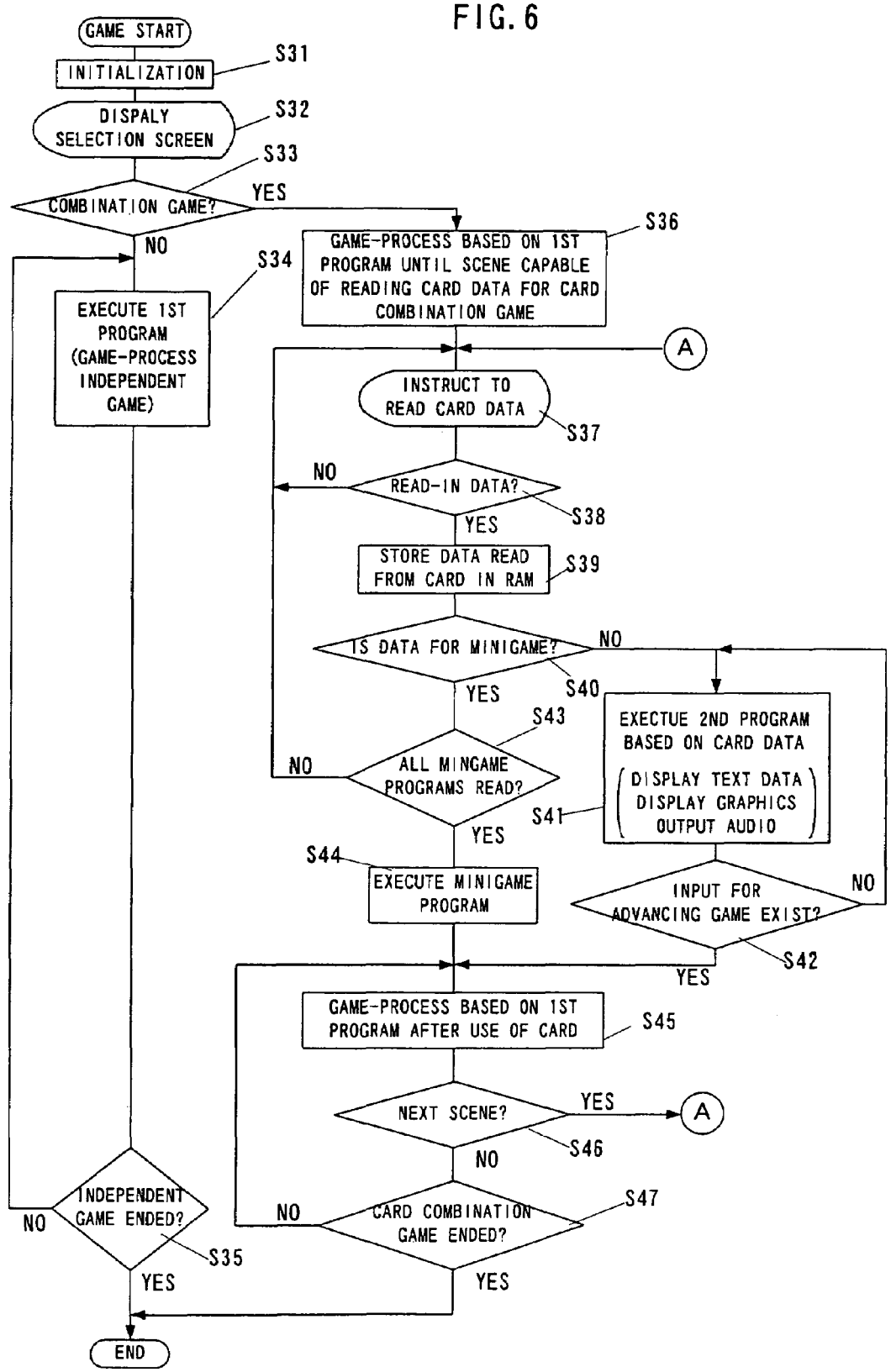
FIG. 6 is a flowchart showing an example of game processing.

FIG. 6 is a flowchart illustrating an example of the game process. Referring to FIG. 2 to FIG. 6, an explanation is presented on the detailed operation of an electronic game using the game cards or a combined game of the game cards and the electronic game. Prior to game start, the player loads the cartridge 40 on the game machine 20 and then turns on the power switch (not shown). In response, the CPU 21 executes the below process on the basis of the program stored in the ROM 41. That is, in step 31 is performed an initialization process, e.g. initially clearing the RAM 24, transferring the backup data stored in the RAM 43 to the RAM 24, and so on. In step 32 is displayed a mode select screen at a start of the game. In this mode select screen, display is made for selecting any of the game mode with independently an electronic game not using the game cards 30 and a combined game of cards and an electronic game using the game cards 30. In the following step 33, it is determined whether selected a combination game with the game cards 30 or not. In the case that a game mode with independently an electronic game not using the game cards 30 has been selected is determined, the process advances to step 34 to process the first program stored in the ROM 41 (program for an electronic game single game or usual game) thereby carrying out image display and sound output on the basis of the process. This process is similar to the conventional portable game and hence detailed explanation is omitted herein. Then, it is determined in step 35 whether the usual game has ended or not. If not ended is determined, the process returns to step 34, repeating the operation of the step 34 and step 35.

If it is determined in the step 33 that a combined game has been selected, the process proceeds to step 36. In the step 36, a game process before the scene the game combined with the game cards 30 is to be executed within the first program stored in the ROM 41. In step 37, on the LCD 26 is displayed a message instructing an operation for reading out the data recorded in the information recording area 34 of the game card 30 (e.g. "Read Card Data", etc.). It is determined in step 38 whether the card data has been read out or not. This determination is made by determining whether or not various ones of data, such as the individuality expressing data read out of the information recording data 34 of the game card 30, is temporarily stored in the RAM 443. If it is determined that the card data has not been read, the process returns to the step S37 to wait for the player to make an operation for reading data of the game card 30. If the card data has been read is determined, then in step 39 the read data from the card is transferred from the RAM 443 to the RAM 24 where it is stored (or temporarily stored).

In step 40, it is determined whether the card-read data stored in the RAM 24 is a part of a mini-game program for enabling a mini-game or not. If not a mini-game program is determined, the process proceeds to step 41 to execute game process added with the card-read data on the basis of the second program (i.e. process for realizing a game added with variation by use of the game card 30 to the game with independently the electronic game based on the first program). For example, where the read data is text data of an explanatory text explaining the feature of a character depicted in the illustration display area 32 or a translation text thereof, the text data read out of the card is displayed on the LCD 26 associatedly with the image data corresponding to the character. Also, where the read data is graphic data of a character depicted in the illustration display area 32, an image of the character based on the graphic data is displayed on the LCD 26. In this case, if character codes, character names, character ability data, etc. are previously recorded in addition to the graphic data in the information recording area 34 of the game card 30 as required, such character code, character name or ability data will be displayed together with the graphic data. Furthermore, where the read data is sound data of a character depicted in the illustration display area 32 (cry or speech voice), the sound output section 29 outputs sound based on the sound data together with the display of the graphic data of the character. In this case, the displaying of graphic data can be realized by reading from the ROM 41 through designation of an reading address on the ROM 41, on the basis of the character code read out of the card. More preferably, the character graphic may be displayed in an animation fashion in a manner the character cries or speaks in association with the generation of sound of cry or speech. Furthermore, when the character identification data having been read is under a predetermined condition (e.g. not a character identification code registered in the RAM 43), the character identification code is registered and one or two or more of data of the after-read text data, graphic data, sound data and text data corresponding to the character are registered. In the following step 42, it is determined whether there is a game advancing instruction or not. If there is no instruction, the operation of the step 41 is continued. When the player operates any of the switches in the operation part to instruct for advancing the game, this instruction is determined in step 42 and the process proceeds to step 45.

In this manner, a combined game of the game cards 30 and the electronic game added with the data read out of the game cards 30 is realized differently from a game with independently an electronic game. As a result, by merely adding in kind a game card 30, a variety of game plays are feasible in compliance with the kinds of the game cards 30 even for a game using the same cartridge 40, thus providing the advantage of realizing an interesting game system.

If it is determined in the above step 40 that the read data is a part of a mini-game program, the process proceeds to step 43. In the step 43, it is determined whether all the programs for the mini-game have been read or not. As mentioned before, the mini-game program is divided into proper bytes and recorded separately in the information recording areas 44 of the game cards 30. In such a case, divisional-program sequence data and total byte data are added as a header so that the divided programs can be rearranged to the former arrangement after once reading out. For this reason, each time part of the mini-game program is read out of one game card 30, it is rearranged according to the order data and stored in the RAM 24. Accordingly, the CPU 24 determines whether the divisional programs stored in the RAM 24 reaches the total bytes or not, thereby determining whether all the mini-game program has been read out or not. If the all has been read out is determined, in step 44 the mini-game program stored in the RAM 24 is executed thereby enabling mini-game play.

In this manner, if the mini-game program is divisionally recorded onto the game cards 30, it is possible to increase the mini-game kinds by adding the kinds of game cards 30. Thus, there is an advantage that the mini-game kinds can be added one after another after the cartridge 40 is purchased. Moreover, the user is highly motivated to collect the game cards 30 according the mini-game program to experience various plays with the use of the common cartridge 40.

Completing the mini-game, in the following step 45 the following game (electronic game not using the game cards 30) process will be executed using the game cards 30 on the basis of the first program. In step 46, it is determined whether a scene is reached allowing a combined game with the next game card 30 or not. If the scene is not reached is determined, it is determined in step 47 whether a game-card combined game has been ended or not. If determined not ended, the process returned to step 45 to repeat the process of the steps 45, 46 and 47. At that time, if it is determined in the step 46 that the scene is reached, the process returned to the step 37 to repeat the process of the steps 37–46. At that time, if it is determined in the step 47 that the game-card combined game has been ended, then the game is ended.

Although in the above embodiment explanation was on the portable game machine having an LCD as one example of a game machine, the invention is not limited to such structure but is applicable to the games using a video game machine or personal computer. In such a case, the storage data on the ROM 41 of the cartridge 40 is stored to an information storage medium for a video game machine, e.g. memory cartridge, magnetic disk, CD-ROM, or DVD (digital versatile disk) or the like. The data reader 45 and the read-data processing circuit will be connected integrally with or externally from the video game machine or personal computer.

Also, the above embodiment explained the example of an electronic game content to capture/raise/collect the monsters, it is pointed out that the invention is not limited to the game explained in any embodiment but is applicable to an arbitrary game provided that the game is a combination of game cards and an electronic game.

The character identification code is not limited to one in the number per character. Where there exist a plurality of kinds of cards that are identical between the characters but different in individuality expressing data, a plurality of identification data may be provided per character.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video game system for playing a video game and for generating a video game display having animated graphics comprising:

a plurality of game cards for use in a card game, each visually portraying a figure of a character and including recorded data, a video game information storage medium storing a video game program relating to game card character figures, a video game machine including a processing system for removably receiving therein the video game information storage medium to execute the video game program, each of said plurality of game cards recording for an associated character depicted, at least identification data of the associated character and characteristic data relating to a characteristic of the associated character and for causing a change to a video image involving an animated and displayed associated character dependent on the progress of said video game;

wherein one of said video game information storage medium and said video game machine includes external information reading circuitry for reading the identification data and characteristic data of the characters recorded on said game cards;

said processing system, when supplied with the identification data and characteristic data read by said external information reading circuitry from one or more of said game cards being operable to animate and display a video display visually portraying said associated character and for processing the video game program of the video game to cause the change to the video image involving said animated and displayed character by using said characteristic data; and at least a portion of a video game program to be added to the video game program stored by the video game information storage medium is obtained from at least one of the plurality of game cards.

2. A video game system according to claim 1, wherein said game cards are trading cards each including a figure of a character differing in rarity value.

3. A video game system according to claim 1, wherein the characteristic data recorded on at least one of said game cards includes sound data related to at least the associated character, and
wherein said processing system generates sound of the associated character on the basis of sound data read by said external information reading circuitry.

4. A video game system according to claim 1, wherein the characteristic data recorded on at least one of said game cards includes text data explaining an individual feature of the associated character, and
wherein said processing system displays text data read by said external information reading circuitry on a game screen.

5. A video game system according to claim 1, wherein at least the identification data and characteristic data of the characters are optically readably recorded on said game cards using a two-dimensional array of dots, and
wherein said external information reading circuitry comprises an optical reader for optically reading the identification data and characteristic data of the characters recorded on said game cards.

6. A video game system according to claim 1, wherein at least the identification data and characteristic data of the characters are electronically readably recorded in a non-volatile memory, and
wherein said external information reading circuitry comprises a reader for electrically reading the identification data and characteristic data of the characters stored in said non-volatile memory of said game cards.

7. A video game system according to claim 1, wherein said video game machine is a hand-held device and includes a display.

8. A video game system according to claim 1, wherein said video game information storage medium includes, for each of a plurality of the characters, a first memory section for storing identification data and characteristic data, and a second memory section that stores identification data and characteristic data acquired during progress of the game.

9. A video game system as in claim 1, wherein said game information storage medium includes, for each of the characters, a first memory section for storing the identification data and characteristic data, and a second memory section for storing identification data and characteristic data acquired during progress of the game, and
said first storage section stores a registering program for writing and registering when the identification data of the character read by said external information reading circuitry is in a predetermined condition, the identification data and characteristic data being read from one of the game cards to said second storage section.

10. A video game system according to claim 1, wherein the at least a portion of the video game program is obtained from more than one of the plurality of game cards.

11. A video game system according to claim 1, wherein at least the identification data and characteristic data of the characters are magnetically recorded in a magnetic recording area formed in one surface of said game cards, and
wherein said external information reading circuitry comprises a magnetic reader for magnetically reading the identification data and characteristic data of the characters recorded in the magnetic recording area of said game cards.

12. A video game system as in claim 1, wherein
said game information storage medium includes, for each of the plurality of characters, a first memory section for storing identification data and characteristic data, and a second memory section for storing identification data and characteristic data acquired during progress of the game,
said plurality of game cards having recorded thereon as characteristic data, data corresponding to the identification data of one or a plurality of the characters, and
said second storage section further storing, when the identification data of the character read by said external information reading circuitry is in a predetermined state, a program for registering additional data read out of one of the game cards in addition to the characteristic data corresponding to the identification data of the character.

13. A video game system for playing a video game providing video game play having animated graphics comprising:
a plurality of collection cards, each visually portraying a figure of a character and including recorded data relating to said character including recorded data enabling animation and display of the character;
a video game information storage medium storing a video game program to display at least some of the characters portrayed on said collection cards on a video image display device;
a video game machine including a processing system for receiving therein said video game information storage medium to execute the video game program;
wherein at least one of the collection cards visually portrays a character previously stored in the video game information storage medium and records data relating to the previously stored character including an identification code of the previously stored character and characteristic data of the previously stored character;
wherein at least another one of said collection cards visually displays a particular character not previously stored in said video game information storage medium and includes display data recorded thereon for animating and displaying a figure of the particular character in an animated manner on the video image display device, an identification code of the particular character and characteristic data of the particular character,
wherein one of said video game information storage medium and said video game machine further comprises external information reading circuitry for reading the identification code and characteristic data recorded on said at least one and said at least another one of the collection cards,
said processing system being operable to
execute the video game program based on the video game program stored in said video game information storage medium in such a manner so as to, when the identification code and characteristic data of the previously stored character are supplied by said external information reading circuitry, change a state of the previously stored character by adding the characteristic data supplied by the external reading circuitry to other characteristic data of the previously stored character; and execute the video game program and process the character data of the particular character, when supplied with the identification code and characteristic data of the particular character read from said external information reading circuitry, to animate and display an image of the particular character as a new character.

14. A video game system according to claim 13, wherein the characteristic data stored on said at least one of the collection cards and said at least another one of the collection cards includes sound data respectively related to the previously stored character and the particular character, and
wherein said processing system generates sound of the previously stored and the particular characters on the basis of sound data read by said external information reading circuitry.

15. A video game system according to claim 13, wherein the characteristic data stored on the at least one of the collection cards includes ability data related at least to the previously stored character, and
said processing system changes a display state of the previously stored character in the video game based upon ability data read by said external information reading circuitry.

16. A video game system according to claim 13, wherein said collection cards each includes a figure of a character differing in rarity value.

17. A video game card for use in a video game system including a video game information storage medium storing a video game program for animating and displaying at least some of the characters depicted on a plurality of such game cards on a video image display device, a video game machine including a processing system for receiving therein said video game information storage medium to execute the video game program; and external information reading circuitry provided in one of said video game information storage medium and said video game machine for reading data recorded in said game card, said game card comprising:
a visually portrayed figure of a character for use in playing a card game,
a machine readable recording of at least an identification code of the character and characteristic data related to said character, said characteristic data including ability data visually recognizably printed on said game card and hidden data not visually recognizably printed on said game card, and
wherein said characteristic data is disposed on said card such that it can be read by said external information reading circuitry and used in a video game played on said video game machine to cause a visual change to a video image of an animated and displayed character dependent on progress of the execution of the video game program; and
the machine readable recording also including additional data including executable instructions to be added to the video game program, the executable instructions being readable by the external information reading circuitry and executable by the processing system of the video game machine.

18. A game card according to claim 17, wherein the characteristic data further includes at least sound data to generate a sound of the character, ability data of the character, and amount data indicating an amount of the sound data and ability data.

19. A game card according to claim 17, wherein the characteristic data further includes at least sound data for generating sound of the character, ability data representative of an ability of the character and text data explaining a feature of the character.

20. A game card according to claim 17, further including additional data corresponding to the identification code of the visually portrayed character and data for determining the amount of data recorded.

21. A game card according to claim 17, wherein said external information reading circuitry comprises an optical reader for optically reading the identification data and characteristic data of the character visually portrayed on said game card, and
wherein said game card includes an optically readable recording of at least the identification data and characteristic data of the character comprising a two-dimensional array of dots.

22. A game card according to claim 17, wherein said external information reading circuitry comprises a reader for reading the identification data and characteristic data of the visually portrayed character, and
wherein said game card includes a non-volatile memory recording at least the identification data and characteristic data of the character.

23. A game card according to claim 17, wherein said external information reading circuitry comprises a magnetic reader for magnetically reading the identification data and characteristic data of the visually portrayed character, and
wherein said game card includes a magnetic memory provided in one surface thereof recording at least the identification data and characteristic data.

24. A video game system for playing a video game having animated graphics comprising:
a first game card visually portraying a figure of a first character and including recorded data relating to the first character,
a second game card visually portraying a figure of a second character and including recorded data relating to the second character;
a video game information storage medium including:
a memory storing a video game program for playing a video game related to said game card and initially storing data relating to the first character but not the second character, and
reading circuitry for reading information from said first and second game cards, the read information from the first card enabling a state of the first character to be changed, and the read information from the second card enabling animation and display of the second character visually portrayed on the second game card during play of the video game as a new character; and
a video game machine including a processing system for removably receiving therein the video game information storage medium to execute the video game program.

25. A video game system according to claim 24, wherein said video game information storage medium includes processing circuitry.

26. A video game system according to claim 24, wherein said video game machine is a hand-held device and includes a display.

27. A video game system according to claim 24, where at least one of said first and second game cards include identification data of the character portrayed thereon and characteristic data relating to a characteristic of the associated character.

28. A video game system according to claim 24, wherein said video game information storage medium includes, for at least the first character, a first memory section for storing identification data and characteristic data, and a second memory section that stores identification data and characteristic data acquired during progress of the video game.

29. A video game system according to claim 24, wherein said first and second game cards respectively include figures of the first and second characters differing in rarity value.

30. A video game system according to claim 24, wherein the data recorded on at least one of said first and second game cards include sound data related to at least its associated character, and wherein said processing system generates sound of the associated character on the basis of sound data read by said reading circuitry.

31. A video game system according to claim 24, wherein said data recorded on at least one of said first and second game cards include text data explaining an individual feature of its associated character, and wherein said processing system displays text data read by said reading circuitry on a game screen.

32. A video game system according to claim 24, wherein said first and second game cards optically readably record by a two-dimensional array of dots at least identification data and characteristic data of the first and second characters, respectively, and wherein said reading circuitry comprises an optical reader for optically reading the identification data and characteristic data of the first and second characters recorded on said first and second game cards.

33. A video game system according to claim 24, wherein said first and second game cards include an electrically readable recording of at least of character identification data and characteristic data of the first and second characters in a non-volatile memory, respectively, and wherein said reading circuitry comprises a reader for electrically reading the identification data and characteristic data of the first and second characters stored in said non-volatile memory of said first and second game cards.

34. A video game system according to claim 24, wherein said first and second game cards include a magnetic recording of at least character identification data and characteristic data of the first and second characters, respectively, in a magnetic recording area formed in one surface thereof, and wherein said reading circuitry comprises a magnetic reader for magnetically reading the identification data and characteristic data of the first and second characters recorded in the magnetic recording area of said first and second game cards.

35. A removable memory for a video game system comprising:

a program memory for storing a video game program involving cards;

a data reader for reading data from at least one card including data enabling animation and display of a new character during play of a video game provided by execution of the video game program and reading data from at least one other card including data enabling a characteristic of a character which has been previously stored by the program memory to be changed during play of the video game provided by execution of the video game program;

processing circuitry for processing data read from the at least one card to animate and display the new character during play of the video game and processing data read from the at least one other card to change an animated and displayed characteristic of the previously stored character; and a connector for connecting to a game machine having a processing system for executing said game program.

36. A removable memory according to claim 35, further including a RAM memory.

37. A removable memory according to claim 35, further including a groove for receiving at least a portion of said game card for reading data from said said at least one card and said at least one other card.

38. A removable memory according to claim 35, further including a first game program memory section for storing a first program for playing a game to display animated characters in a video game, and a second game program memory section for storing a second program for executing a game using characteristic data to be added to the first game program when supplied with identification code and characteristic data read from said at least one other card by the data reader to animate and display the previously stored character during play of a video game based on the read data.

39. A removable memory according to claim 37, wherein said removable memory comprises a cartridge including a semiconductor memory storing the first program and second program, and a case accommodating said semiconductor memory and integrally formed with said data reader.

40. A video game card for use in a video game system including a video game information storage medium storing a video game program for animating and displaying at least some of the characters depicted on a plurality of such game cards on a video image display device, a video game machine including a processing system for receiving therein said video game information storage medium to execute a video game program; and external information reading circuitry provided in one of said video game information storage medium and said video game machine for reading data recorded in said game card, said game card comprising:

a visually portrayed figure of a character for use in playing a card game, a machine readable recording of at least an identification code of the character and characteristic data related to said character, said characteristic data including ability data visually recognizably printed on said game card and hidden data not visually recognizably printed on said game card, and wherein said characteristic data is disposed on said card such that it can be read by said external information reading circuitry and used in a video game played on said video game machine to cause a visual change to a video image of an animated and displayed character dependent on progress of the execution of the video game program;

wherein said game card further comprises additional data recorded thereon in addition to said characteristic data, the additional data including a mini-game program for playing a video game which may be added to the game based on the video game program stored in said video game information medium, and wherein the mini-game program recorded on said game card records a mini-game program for realizing a mini-game in said game card separate from the video game program stored in said video game information storage medium, and wherein said game card further comprises order data recorded thereon for rearranging parts of the mini-game program.

41. A video game system for use with a plurality of game cards each visually portraying a figure of a character and storing information in the form of a two dimensional array of dots comprising:
   reading circuitry for reading the two dimensional array of dots from one of said game cards to enable animation and display of a new character in video game play and reading the two dimensional array of dots from another one of said game cards to enable said game cards to enable a change in animation and display of another character;
   a video game information storage medium including a memory storing a video game program for playing a game related to said at least said another one of the game cards and storing data for animation and display of the another character prior to reading the two dimensional array of dots from said another one of the game cards, and
   a processing system for executing a card related video game program, wherein at least a portion of said card related video game program is stored in said video game information storage medium, said processing system being operable to process video graphics image data embodied in said two-dimensional array of dots from said one of the game cards and said another one of the game cards to generate and display the new character and change the another character for video game play.

42. A video game system according to claim 41, wherein said reading circuitry and said video game information storage medium are housed in a removable cartridge.

43. A video game system according to claim 41, wherein said processing system is a hand-held device and includes a display.

44. A video game system according to claim 41, where at least one of said game cards includes identification data of the character portrayed thereon and characteristic data relating to a characteristic of the associated character.

45. A video game system according to claim 41, wherein said one of the game cards and said another one of the game cards respectively include figures of characters differing in rarity value.

46. A video game system according to claim 41, wherein at least one of said game cards includes sound data related to at least an associated character, and wherein said processing system generates sound of the character on the basis of sound data read by said reading circuitry.

47. A video game system for playing a video game having animated graphics and for generating a display comprising:
   a plurality of game cards for use in a card game, each visually portraying a figure of a character and including recorded data including recorded data to enable animation and display of the character,
   a video game information storage medium storing a game program relating to game card character figures,
   a video game machine including a processing system for removably receiving therein the video game information storage medium to execute a video game program,
   one of said plurality of game cards recording, for an associated character visually portrayed on said one of the plurality of game cards, at least identification data and characteristic data relating to a characteristic of the associated character portrayed on said one of the plurality of game cards, said identification data and characteristic data of the associated character portrayed on said one of the plurality of game cards, when processed by said processing system, causing a change to a video image involving an animated and displayed associated character dependent upon the progress of said video game;
   another one of said plurality of game cards recording, for a special associated character visually portrayed on said another one of said plurality of game cards, at least identification data and characteristic data of the special character portrayed on said another one of the plurality of game cards, said identification data and characteristic data of the special character, when processed by the processing system, adding a video image of the special character as a new character in the video game;
   wherein one of said video game information storage medium and said video game machine includes external information reading circuitry for reading the identification data and characteristic data of the characters recorded on said game cards,
   said processing system, when supplied with the identification data and characteristic data read by said external information reading circuitry from said one of and said another one of the game cards, processes the characteristic data to apply a change to said video image of an animated and displayed associated character as a result of processing the characteristic data of said one of the game cards and the video game program stored in said game information storage medium and to add the special character as a new character as a result of processing characteristic data of said another one of the game cards and the video game program stored in said game storage medium.

48. A video game card for use in a video game system including a video game information storage medium storing a video game program for animating and displaying at least some of the characters depicted on a plurality of such game cards on a video image display device, a video game machine including a processing system for receiving therein said video game information storage medium to execute a video game program; and external information reading circuitry provided in one of said video game information storage medium and said video game machine for reading data recorded in said game card, said game card comprising:
   a visually portrayed figure of a character for use in playing a card game,
   a machine readable recording of at least an identification code of the character and characteristic data related to said character, said characteristic data including ability data visually recognizably printed on said game card and hidden data not visually recognizably printed on said game card, and
   wherein said characteristic data is disposed on said card such that it can be read by said external information reading circuitry and used in a video game played on said video game machine to cause a visual change to a video image of an animated and displayed character dependent on progress of the execution of the video game program;
   wherein said video game card also comprises a recording of additional data in addition to said characteristic data and the additional data includes a mini-game program for playing a game which may be added to the game based on the video game program stored in said video game information storage medium.

49. A game card for use in a video game system including a video game information storage medium storing a game program for generating at least some of the characters depicted on a plurality of such game cards on an image display device; a video game machine including a processing system for receiving therein said video game information storage medium to execute a video game program; and an external information reading circuitry provided in one of said video game information storage medium and said video game machine for reading data recorded in said game card, said game card comprising:

a visually portrayed figure of a character for use in playing a card game, a machine readable recording of at least an identification code of the character and characteristic data related to said character, and wherein said characteristic data is disposed on said card such that it can be read by said external information reading circuitry and used in a video game played on said game machine, wherein said game card is machine-readably recorded with image data for animating and displaying a figure of the character, and said image data is read by said external information reading circuitry from the game card thereby to animate and display the character's figure in a game by said game machine; and wherein at least a portion of a game program, to be added to the game program stored in the information storage medium, is received via the external information reading circuitry as data representing executable instructions stored as machine readable recorded data.

50. A game card for use in a video game system including a video game information storage medium storing a game program for generating at least some of the characters depicted on a plurality of such game cards on an image display device; a video game machine including a processing system for receiving therein said video game information storage medium to execute a video game program; and an external information reading circuitry provided in one of said video game information storage medium and said video game machine for reading data recorded in said game card, said game card comprising:

a visually portrayed figure of a character for use in playing a card game, a machine readable recording of at least an identification code of the character and characteristic data related to said character, and wherein said characteristic data is disposed on said card such that it can be read by said external information reading circuitry and used in a video game played on said game machine to control or change animation and display of the character play of the video game, and wherein said game card includes, in a machine-readable manner, printed dots distributed within blocks each of which has a predetermined area, and by printing the dots with different distributions, at least the identification data and the character data are machine-readably recorded on said game card to control or change animation and display of the character play of the video game;

wherein the printed dots printed on the game card represent executable instructions of a game program to be added to the game program stored in the information storage medium.

51. A video game system for playing a video game and for generating a video game display having animated graphics comprising:

a plurality of game cards for use in a card game, each visually portraying a figure of a character and including recorded data, a video game information storage medium storing a video game program relating to game card character figures, a video game machine including a processing system for removably receiving therein the video game information storage medium to execute the video game program, each of said plurality of game cards recording for an associated character depicted, at least identification data of the associated character and characteristic data relating to a characteristic of the associated character and for causing a change to a video image involving an animated and displayed associated character dependent on the progress of said video game;

wherein one of said video game information storage medium and said video game machine includes external information reading circuitry for reading the identification data and characteristic data of the characters recorded on said game cards; and said processing system, when supplied with the identification data and characteristic data read by said external information reading circuitry from one or more of said game cards being operable to animate and display a video display visually portraying said associated character and for processing a video game program of the video game to cause the change to the video image involving said animated and displayed character by using said characteristic data;

wherein said video game program to be executed by the processing system of the video game machine includes instructions obtained from at least one of said plurality of game cards to be added to the video game program stored by the video game information storage medium.

52. A video game system according to claim 51, wherein said external information reading circuitry is operable to read data from a two-dimensional dot array recorded on at least one of said plurality of game cards.

53. A video game system for playing a video game having animated graphics comprising:

a first game card for use in a card game, said first game card visually portraying a figure of a character and including recorded data, a video game information storage medium including:

a memory storing a video game program for playing a video game related to said first game card, and reading circuitry for reading information from said first game card, the read information enabling animation and display of the character visually portrayed on the first game card during play of the video game; and a video game machine including a processing system for removably receiving therein the video game information storage medium to execute the video game program;

wherein the first game card has encoded thereon a first set of program instructions for execution by said processing system.

54. A video game system according to claim 53, wherein the video game system includes a second game card having graphical information thereon graphically depicting game related information and having encoded thereon a second set of program instructions for execution by said processing system, wherein at least said first game card and said second game card must be read by said reading circuitry to enable said processing system to execute said game program.

55. A video game system for playing a video game and for generating a video game display having animated graphics comprising:

a plurality of game cards for use in a card game, each visually portraying a figure of a character and including recorded data, a video game information storage medium storing a video game program relating to game card character figures, a video game machine including a processing system for removably receiving therein the video game information storage medium to execute the video game program, each of said plurality of game cards recording for an associated character depicted, at least identification data of the associated character and characteristic data relating to a characteristic of the associated character and for causing a change to a video image involving an animated and displayed associated character dependent on the progress of said video game;

wherein one of said video game information storage medium and said video game machine includes external information reading circuitry for reading the identification data and characteristic data of the characters recorded on said game cards; and said processing system, when supplied with the identification data and characteristic data read by said external information reading circuitry from one or more of said game cards being operable to animate and display a video display visually portraying said associated character and for processing a video game program of the video game to cause the change to the video image involving said animated and displayed character by using said characteristic data;

said external information reading circuitry reads recorded data from said plurality of game cards, the recorded data embodying program instructions, and said processing system executes program instructions embodied by the recorded data read from each of said plurality of game cards.

56. A video game system according to claim 55, wherein a storage device for storing a set of program instructions is embodied in a card reading module, and said processing system is embodied in a hand held housing, said card reading module being removably connectable to said handheld housing.

57. A video game system according to claim 55, wherein the video game system determines whether a sufficient number of game cards have been read to execute instructions obtained from said plurality of game cards.

58. A video game system according to claim 55 wherein the video game system rearranges the order of stored information read from said plurality of game cards.

59. A video game system according to claim 55 wherein the recorded data read from said plurality of game cards includes program sequence data and the video game system rearranges the order of stored information read from said plurality of game cards based on the program sequence data.

60. A video game system according to claim 55 wherein the recorded data read from said plurality of game cards includes total program amount data and wherein the video game system determines whether a sufficient number of game cards have been read to execute instructions obtained from said plurality of game cards based on the total program amount data.

* * * * *